Sept. 30, 1969  W. MOSEBACH ET AL  3,470,307
CAPACITORS
Filed Aug. 16, 1967

Inventors
WOLFGANG MOSEBACH
WILLIAM E. R. EVANS
RICHARD S. STEVENS
By
Attorney

United States Patent Office 3,470,307
Patented Sept. 30, 1969

3,470,307
CAPACITORS
Wolfgang Mosebach, William E. R. Evans, and Richard S. Stevens, South Devon, England, assignors to International Standard Electric Corporation, New York, N.Y., a corporation of Delaware
Filed Aug. 16, 1967, Ser. No. 660,956
Claims priority, application Great Britain, Aug. 26, 1966, 38,410/66
Int. Cl. H02g 15/26
U.S. Cl. 174—12                                      6 Claims

ABSTRACT OF THE DISCLOSURE

This invention is for a housing for an oil filled capacitor which has a working chamber containing the electrical component, an air chamber sealed off from the working chamber but communicating with it through a tube having one or more orifices at the centroid of the air chamber; oil fills the housing to a level covering the orifices for all temperatures within the operating range at any attitude of the capacitor.

BACKGROUND OF THE INVENTION

The invention relates to hermetically sealed housings for oil-immersed electrical components.

High voltage electrical components, such as transformers and capacitors, are commonly immersed in oil. Provision has to be made for expansion of the oil with temperature change. This presents a difficulty when the housing for the component is required to be hermetically sealed and where, furthermore, the housing may be held in any attitude during operation of the component. Patent 2,243,814 is an example of the prior art.

SUMMARY OF THE INVENTION

According to the present invention there is provided a hermetically sealed housing for an oil-immersed electrical component wherein the housing includes an air chamber sealed off from a working chamber containing the electric component and an oil tube communicating between two said chambers through one or more small orifices in the tube, and wherein the amount of oil in the housing and the position of the orifice or orifices are such that, throughout a specified range of operating temperatures and for any attitude of the housing, the or each orifice is immersed in the oil, the size of the orifice or orifices being sufficiently small for surface tension to prevent entry into the tube of any air bubble formed in the air chamber.

DESCRIPTION OF THE INVENTION

Figure 1:
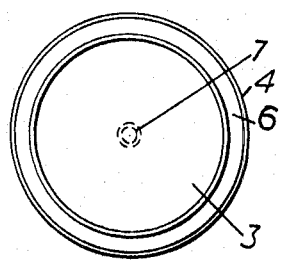
Figure 3:
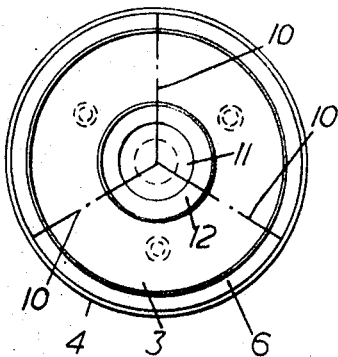
Figure 2:
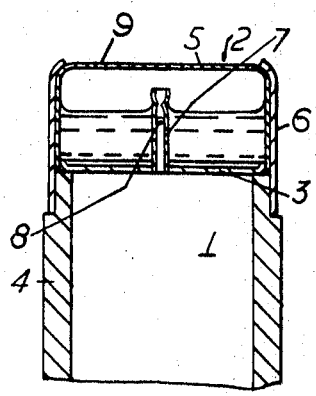
Figure 4:
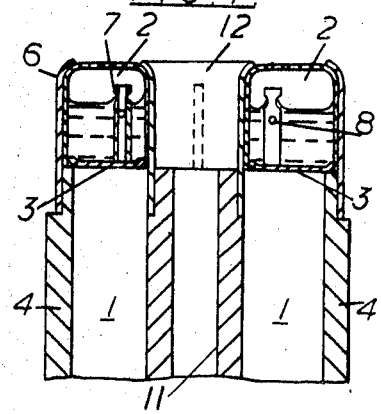

Embodiments of the invention will be described with reference to the accompanying drawings, which illustrate the relevant parts of capacitor housings for use in a submerged repeater for transoceanic telephone cables and in which:

FIG. 1 is a plan view and FIG. 2 an elevational view in section of part of a capacitor housing; and FIGS. 3 and 4 are corresponding views for a housing of annular cross-section.

The housing of FIGS. 1 and 2 includes a working chamber 1 containing a capacitor, not shown, and an oil chamber 2 sealed off from the working chamber by a metal plate 3 seated on and brazed to the end of the cylindrical wall 4 of the chamber 1. The air chamber 2 is enclosed between the plate 3 and an inverted cup-shaped cover 5, sealed to the plate 3. The members 3 and 5 are located with respect to the wall 4 by means of a metal sleeve 6 fitting about the cover 5 and the end of the wall 4. An oil tube 7 is fixed in an aperture through the plate 3 to project into the air chamber 2. The upper end of the oil tube, as viewed in the drawing, is sealed off, communication between the chambers 1 and 2 being afforded by means of a plurality of small orifices 8 in the wall of the oil tube. In some cases, as will be discussed below, a single orifice 8 in the side wall of the tube may suffice, or, alternatively, a single orifice may be provided by leaving the tube 7 open ended. In the embodiment illustrated, the tube 7 is fairly wide and, as stated, there are a plurality of the orifices 8, the end of the tube being sealed off.

After the capacitor has been inserted in the working chamber 1, all voids in this chamber are filled with oil through a filler hole 9 in the cover 5 of the air chamber. The amount of oil introduced and the position of the orifices in the oil tube 7 are such that, after the filler hole has been sealed off, sufficient air remains in the chamber 2 to allow for expansion of oil throughout the range of temperatures to which the unit may be subjected during transport and use while, for any attitude of the housing, the orifices shall remain covered with oil at all temperatures within the above mentioned range.

In the case of a submerged repeater, quite apart from any conditions of transport before the cable is laid, during the cable-laying operations the repeater, and hence the capacitor housing, will adopt a variety of different attitudes, while its final attitude on the sea bed is unpredictable. Furthermore it may be subjected to sudden rotation, so that the chamber 2 may become inverted with respect to the orientation shown in the drawing. During all this air must not be allowed to enter the working chamber 1, but there must be sufficient air in the chamber 2 to prevent excessive rise of pressure within the housing. Although it is possible with many configurations of housing and air chamber to position the orifices 8 otherwise and to adjust the oil level accordingly, it is preferred to locate the orifice or orifices of the oil tube in or immediately adjacent the geometrical centroid of the air chamber. Provided then that at all temperatures within the required range the air chamber is always more than half full of oil, no orifice will lie above the oil surface, irrespective of the attitude of the housing.

It is necessary to ensure that the impedance offered to the free flow of oil between the chamber 2 and the working chamber 1 be small.

The viscosity of the impregnant used, especially at the lowest working temperature of the capacitor, determines the width of the oil tube 7 which may sensibly be used. This width and the surface tension of the impregnant determines whether it is preferable to use the tube open ended or with one or more orifices which are smaller than the diameter of the tube. The orifice or orifices must be small enough to prevent small air bubbles from being trapped in the mouth of the tube in the event of the housing being suddenly inverted.

In a practical embodiment of a capacitor housing such as illustrated in the drawings, the design temperature range is from −10° C. to +40° C. during storage and transport and from 0° C. to +32° C. during use. A suitable impregnating oil has a viscosity which varies from 850,000 centistokes at 0° C. to 2,500 centistokes at 40° C. and whose surface tension is 35 dynes/cm. at room temperature. The oil tube 7 is of 0.1 inch diameter, has a wall thickness of 0.008 inch, and four holes each of 0.04 inch diameter are provided for the orifices 8. The orifices are thus sufficiently small in size for surface tension to prevent entry into the tube 7 of any air bubble which may pass over one of them while the housing is being moved.

The temperature ranges quoted above are not to be taken as limiting use of the invention. In the case of capacitor housings the invention may be used for any temperature range normally employed for impregnated capacitors as, for example, −40° C. to +85° C. or −55° C. to +100° C. The upper temperature limit is here determined by the stability of the impregnant or of the dielectric film used for the capacitor—in the case of other kinds of electrical components analogous considerations will apply—while the total temperature range is determined by the size of air bubble necessary to allow for oil expansion over the whole temperature range, and which, on the other hand, can be accommodated in the available space.

For some configurations of housing it may not be possible to provide a single air chamber for the housing having a centroid lying within the walls of the chamber. Thus in the embodiment of FIGS. 3 and 4 a cylindrical housing of annular cross section is provided, for passage of the cable through the capacitor. The construction of the housing is generally similar to that described in detail with reference to FIG. 2 except insofar as concerns the air chamber. The centroid of an annular chamber lies on its axis. To overcome this difficulty a plurality of separated air chambers are provided each having its own oil tube 7 communicating with the single annular working chamber 1, and sufficient in number, taking into account the ratio of external to internal diameter of the housing, to ensure that the centroid of each chamber lies within its walls so that orifices 8 may be positioned immediately adjacent the centroid. In the embodiment illustrated in FIGS. 3 and 4 three similar air chambers are provided by means of radial partitions indicated diagrammatically by the broken line 10 in FIG. 3. In other respects, as stated above, the construction is similar to that of FIGS. 1 and 2, the internal wall of the housing being shown at 11 with an inner sleeve 12 co-operating with the sleeve 6 for alignment purposes.

It is to be understood that the foregoing description of specific examples of this invention is made by way of example only and is not to be considered as a limitation on its scope.

We claim:

1. A hermetically sealed housing for an oil-immersed electrical component comprising a working chamber containing the electrical component, an air chamber sealed off from said working chamber, a tube connected between said chambers having an open end communicating with said working chamber and a sealed end positioned in said air chamber, at least one orifice in the wall of said tube within said air chamber, the amount of oil in the housing and the position of the orifice being such that throughout a specified range of operating temperatures and for any attitude of the housing said orifice and open end are immersed in said oil, the size of said orifice being sufficiently small for surface tension to prevent entry into the tube of any air bubble formed in the air chamber.

2. A housing as claimed in claim 1 wherein said tube has more than one orifice.

3. A housing as claimed in claim 1 wherein said orifice is located substantially in the geometrical centroid of the air chamber.

4. A housing as claimed in claim 3 further comprising a plurality of separated and similar air chambers and tubes connected to a common working chamber, said air chambers being sufficient in number for the centroid of each to lie within its walls and the respective orifices being positioned immediately adjacent the centroids.

5. A housing as claimed in claim 4 of annular cross section.

6. A housing according to claim 1 wherein said electrical component is a capacitor.

References Cited

UNITED STATES PATENTS

| | | | |
|---|---|---|---|
| 1,394,143 | 10/1921 | Coolidge. | |
| 1,508,201 | 9/1924 | Treanor | 220—85 |
| 1,534,749 | 4/1925 | Troy | 174—12 |
| 1,536,948 | 5/1925 | Thomson | 317—243 X |
| 1,599,245 | 9/1926 | Pornin | 174—12 |
| 2,416,130 | 2/1947 | Treanor | 336—94 |
| 2,444,351 | 6/1948 | Hofberg | 174—12 |

LEWIS H. MYERS, Primary Examiner

A. T. GRIMLEY, Assistant Examiner

U.S. Cl. X.R.

174—13; 336—58; 317—243